United States Patent
Gelbman et al.

(10) Patent No.: US 8,126,428 B2
(45) Date of Patent: Feb. 28, 2012

(54) SUBSCRIBER MANAGEMENT SYSTEM FOR A COMMUNICATION NETWORK

(75) Inventors: Peter Gelbman, Kirkland, WA (US); Jeffrey Sewell, Kirkland, WA (US); Mark Winter, Seattle, WA (US)

(73) Assignee: Clearwire Corporation, Kirkland, WA (US)

( * ) Notice: Subject to any disclaimer, the term of this patent is extended or adjusted under 35 U.S.C. 154(b) by 837 days.

(21) Appl. No.: 12/186,451

(22) Filed: Aug. 5, 2008

(65) Prior Publication Data

US 2009/0042537 A1    Feb. 12, 2009

Related U.S. Application Data

(60) Provisional application No. 60/954,537, filed on Aug. 7, 2007.

(51) Int. Cl.
  *H04M 11/00*  (2006.01)
  *H04M 3/42*  (2006.01)
(52) U.S. Cl. .................................... 455/406; 455/414.1
(58) Field of Classification Search .......... 455/405–408, 455/414.1, 418–420, 426.1, 410–411; 370/338, 370/328, 352, 230, 354–356
See application file for complete search history.

(56) References Cited

U.S. PATENT DOCUMENTS

| | | | |
|---|---|---|---|
| 7,181,493 | B2 | 2/2007 | English et al. |
| 7,831,489 | B2 * | 11/2010 | Hamel et al. ..................... 705/34 |
| 7,995,990 | B1 * | 8/2011 | Andreasen et al. ........... 455/408 |
| 2007/0153798 | A1 * | 7/2007 | Krstulich ....................... 370/392 |
| 2007/0220251 | A1 * | 9/2007 | Rosenberg et al. ........... 713/156 |
| 2007/0223437 | A1 * | 9/2007 | Virgile ........................... 370/338 |
| 2008/0056240 | A1 * | 3/2008 | Ellis et al. .................... 370/352 |

FOREIGN PATENT DOCUMENTS

KR   1020060009775   2/2006

* cited by examiner

*Primary Examiner* — Brandon Miller
(74) *Attorney, Agent, or Firm* — Michael J. Donohue; Davis Wright Tremaine LLP

(57) ABSTRACT

A subscriber management system for a communication system having a radio access network coupled to by a gateway node to a packet switched network. The system consolidates three prior art subscriber management system components, a DPI device, a QoS Policy Manager 40, and an Application Manager 28, into a DPI platform. The system also relocates functions to the DPI platform that were previously provided by the gateway node in prior art networks. Specifically, an Accounting Client 34, a Hotlining function 36, and a QoS SFA function 44 are located to the DPI platform. By consolidating network components and relocating functions to the DPI platform, the number of control interfaces in the network can be reduced. Further, network components produced by different vendors may be integrated more easily. A method of implementing hotlining in the system is also provided.

32 Claims, 4 Drawing Sheets

SUBSCRIBER MANAGEMENT SYSTEM FOR A COMMUNICATION NETWORK

CROSS REFERENCE TO RELATED APPLICATION(S)

This application claims the benefit of U.S. Provisional Application No. 60/954,537, filed Aug. 7, 2007.

BACKGROUND OF THE INVENTION

1. Field of the Invention

The present invention is directed generally to a subscriber management system for a communication network and more particularly to a subscriber management system for a wireless communication network.

2. Description of the Related Art

With the growth and ever-expanding services and capabilities of the Internet and data networking at large, operators of commercial communication networks have increasing needs for effective and efficient methods and systems for managing network subscribers and policies related to their services and applications. These fundamental business management functions include various administrative, accounting, and traffic related management functions that must be performed by a commercial communication network, such as a mobile broadband wireless network. Because mobile broadband wireless networks have inherently less access to bandwidth and increased performance challenges, these management functions are important to providing an acceptable quality of service to customers, and to proper operation of the network.

Most existing network subscriber management strategies were born out of legacy cellular technologies. They tend to focus on a few specific, simple elements of the subscriber management system. They are also based on network architecture models that may not be optimal for some broadband wireless network operators (see FIG. 1). Most existing and emerging strategies are centered on Mobile IP and IP Multimedia Subsystem ("IMS") architectures, and tend to distribute various subscriber management functions over many different network nodes with similar or overlapping functions. These approaches impose extra network nodes, interfaces, and logical entities into the core routing or switching platforms that may not be optimally suited to performing these tasks. These approaches may be less than optimal for "Greenfield" wireless broadband network operators (i.e., operators of new equipment as opposed to those who operate pre-existing or upgraded equipment) who do not have the same network architecture requirements as operators who need to leverage older technology infrastructure. These issues may result in increased complexity, costs, and scalability limitations for a network operator, while failing to address ever-increasing needs of emerging, dynamic subscriber management requirements.

An exemplary prior art communications network 10 may be viewed in FIG. 1. The communications network includes an architecture that is common in existing 3G cellular and some emerging WiMAX technologies. The communications network 10 includes a radio access network ("RAN") 14 in which one or more Access-Service-Networks ("ASN") 12A and 12B are coupled to a core Switch/Router platform 13. The core Switch/Router platform 13 is also coupled to a packet-switched network 16, such as the Internet, external to the RAN 14. The communications network 10 communicates wirelessly with one or more mobile stations ("MS") 18 each operated by a user.

Each of the one or more Access-Service-Networks ("ASN") 12A and 12B includes one or more base-stations ("BS") coupled to an Access-Service-Network-Gateway ("ASN-GW") node. For example, in the communications network 10 depicted in FIG. 1, the ASN 12A includes a BS 22A and a BS 22B coupled to the ASN-GW node 20A and the ASN 12B includes a BS 22C and a BS 22D coupled to the ASN-GW node 20B. In ASN 12B, the BS 22C and BS 22D are coupled also to a Base Station Controller ("BSC") 26B. In existing 3G cellular and some emerging WiMAX technologies, it is common to terminate a user data "session" in the ASN-GW node (e.g., ASN-GW node 20A or ASN-GW node 20B) or a Packet-Data-Serving-Node ("PDSN") (not shown), which is located between the radio access network ("RAN") 14 and the packet-switched network 16 (e.g., the Internet).

In many implementations, the communications network 10 includes a packet switched portion 24 (e.g., the components and connections connecting the BS 22A-22D to the external packet-switched network 16) that is tightly coupled with the elements communicating using radio signals (e.g., the BS 22A-22D). As a result, the BSs and ASN-GW are often provided by the same equipment vendor. This paradigm is actually a holdover from legacy circuit-switched cellular architectures in which BSs and base-station-controller(s) ("BSC") (e.g., the BS 22C, the BS 22D, and the BSC 26B) were almost always provided by the same vendor. However, the industry appears to be moving toward a more "open" model in which the radio access functions are decoupled from core routing functions. To ensure that a BS and an ASN-GW from different vendors will work together, this approach requires standardized interfaces and interoperability testing/certification processes. At this time, most vendors have not fully embraced this approach, and it has yet to emerge in real world deployments.

The subscriber management functions performed by the communications network 10 typically include accounting, hotlining, Quality of Service ("QoS"), and Deep Packet Inspection ("DPI"). In FIG. 1, arrows depict control plane interfaces related to these subscriber management functions. Arrows "A" show Accounting interfaces, arrows "B" show hotlining interfaces, arrows "C" show QoS policy management interfaces. The bold black lines "D" show the data plane traffic interfaces.

Accounting functionality includes accounting, charging, and reconciliation. Typically, the communication network 10 will include an Authentication/Authorization/Accounting ("AAA") server 30 configured to interact with accounting functionality incorporated into other network elements that process subscriber traffic. For example, each of the ASN-GWs 20A and 20B includes an Accounting client 34A and 34B, respectively, configured to interact with the AAA server 30.

Methods of accounting range from simple to very complex. An example of very simple accounting method includes using communication session Start and Stop triggers generated by one or more components of the network (such as the ASN-GW 20A). These triggers are communicated to the AAA server 30, which uses them to determine when the user used the communications network 10 and/or the total amount of time the user used the communications network 10 during a communication session.

Emerging technologies allow the network operator to determine application level details about communication traffic flows. This creates a very rich and flexible accounting environment in which the network operator can bill the customer based on the utilization of services by type, such as movies, shopping, chat, email, etc. As a general rule, the more detailed information a network operator has about its customers and their usage of the communication network 10, the more accurately the network operator can manage its bandwidth.

Hotlining allows the network operator to provide services to a user who is not authorized to access packet data services. A user who was previously authorized to use such services may became unauthorized as a result of a problem or issue, such as nonpayment, inability to pay because of a depleted prepaid account, expiration of a credit card, suspected of fraudulent use, and the like. Such a user may wish to seek reinstatement of data packet services. Alternatively, the unauthorized user may wish to subscribe to such services for the first time (i.e., initial provisioning of a subscribers service.). In either case, the network operator may "hotline" the user for resolution of the problem/issue or to subscribe the new user to data packet services. When the user is hotlined, their packet data service is redirected (by a hotlining function 36A in the ASN-GW 20A and a hotlining function 36B in the ASN-GW 20B) to a Hotline Application ("HLA") (not shown) that notifies the user of the reason(s) that they have been hotlined and offers them a means to address the reason(s) while blocking access to packet data services.

Quality of Service ("QoS") refers to service policies applied to subscriber data traffic in the communications network. These policies reference user-specific profiles that tell the network to what type of service-level-agreement the user has subscribed and/or which service(s) the subscriber is authorized to access on the network. These policies are propagated to network elements, which manage service flows and network bandwidth among all subscribers.

QoS elements in prior art communication networks typically include a QoS Policy Manager 40 (which is also frequently referred to as a Policy Function) that manages a centralized QoS Policy Server database (not shown) and related administrative functions pertaining to user-specific QoS policies and rules. The QoS Policy Manager 40 typically interacts with other QoS aware network entities that implement or enforce QoS for subscriber traffic in some portion(s) of the network. For example, the QoS Policy Manager 40 interacts with an Application Manager 28, which manages communications with non-IMS application servers 29, and an IMS/Application service framework 31. As is apparent to those of ordinary skill in the art, non-IMS application servers include servers configured to provide location based services ("LBS"). Such servers are typically internally developed application servers using proprietary interfaces and APIs. In contrast, an IMS server provides an IMS application, such as VoIP, using standard IMS/SIP interfaces and APIs.

On the "northbound" interface, the QoS Policy Manager 40 typically interacts closely with AAA server 30, which usually houses the primary user-specific profile definitions and service authorizations. The QoS Policy Manager 40 translates these profiles into more granular QoS policies that will be applied in the network. On the "southbound" interface, the QoS Policy Manager 40 typically talks to Service-Flow-Authorization ("SFA") logical entities, such as a QoS SFA function 44A in the ASN-GW 20A of the ASN 12A and a QoS SFA function 44B in the ASN-GW 20B of the ASN 12B. These logical entities typically reside in router/gateway network nodes that process (and terminate) a user's data session. These functions are responsible for applying the QoS policies out to the edge of the network. In a wireless network, this typically means managing the QoS service flows that will be authorized and enabled on the radio links between a BS (e.g., the BS 22A and 22B) and mobile subscribers each operating a MS 18.

Deep Packet Inspection ("DPI") is a network packet filtering mechanism that examines the data part of a through-passing packet, searching for predefined criteria to decide whether the packet can pass. DPI devices have the ability to look at Layer 2 through Layer 7 of the OSI model, including headers and data protocol structures. The communications network 10 includes a DPI device 50 configured to identify and classify the traffic based on a rules database (not shown) that includes information extracted from the data part of a packet. DPI is normally in the bearer (data) path, and is "transparent" to other network functions. Thus, conventional subscriber management architectures and standards typically do not specify DPI as a required function. For this reason, DPI is illustrated as having a dashed line boarder. However, DPI is typically considered an essential function and is present in virtually every commercial service provider network today.

DPI is being used increasingly by network operators for security analysis and bandwidth abuse purposes. Using DPI, network devices can analyze flows, compare them against policy, and then treat the traffic appropriately (i.e., block, allow, rate limit, tag for priority, mirror to another device for more analysis or reporting, and the like). The DPI device 50 also identifies flows, enabling control actions to be based on accumulated flow information rather than packet-by-packet analysis.

In the conventional architecture model depicted in FIG. 1, three of the four primary subscriber management functions (Accounting, Hotlining, and QoS) described above are implemented at least in part in the vendor-specific ASN-GW. Specifically, accounting is implemented in part in the Accounting Client 34, hotlining in the Hotlining function 36, and QoS in the QoS SFA function 44. This system architecture has many undesirable aspects.

First, this system architecture is inefficient. The large number of arrows "A," "B," and "C" (i.e., control interfaces) illustrate the excessive number of control plane interfaces which impose resource limitations on their respective network elements. Many of these interfaces may have a completely different mapping from the primary bearer or data plane traffic flow, which may create network inefficiencies. In other words, packets traveling across the control plane interfaces may travel across different network nodes than the packets traveling across the data plane traffic interfaces.

Second, the system is complex because each of the Accounting Client 34, Hotlining function 36, and QoS SFA function 44 of the ASN-GW 20 has an interface to another network element (e.g., AAA Server 30, QoS Policy Manager 40, and Core Switch/Router platform 13). Having multiple interfaces from many functions within the ASN-GW to multiple elements in the network creates complexity, and increases the processing requirements and memory requirements in both the ASN-GW and the other network elements.

Third, this system makes using RAN components manufactured by more than one vendor difficult. For example, referring to FIG. 1, a RAN vendor "A" may own the components of the ASN 12A which are illustrated shaded gray (i.e., the BS and ASN-GW shaded gray) and a RAN vendor "B" may own the components of the ASN 12B which are unshaded (i.e., the unshaded BS 22C and 22D and the ASN-GW 20B). In this example, the components shaded gray are assumed to have been manufactured by a different company and use a different protocol than the unshaded components. In this scenario, the Accounting Client 34, Hotlining function 36, and QoS SFA function 44 and their associated interfaces to the other network entities are all duplicated. This is an inefficient use of system resources, significantly increases the number of interfaces, further compounds the complexity, processing, and memory requirements of the network.

Fourth, different RAN equipment vendors may use different RAN architectures. As an example, the RAN vendor "A" may implement a RAN with only the BS 22A, the BS 22B, and the ASN-GW 20A. On the other hand, the RAN vendor "B" may implement the BS 22C, the BS 22D, the BSC 26B, and the ASN-GW 20B. Certain subscriber management functions may be incorporated into the BSC 26B instead of the ASN-GW 20B, necessitating additional interfaces within the network 10, which as described above causes related issues.

Fifth, the prior art conventional architectures manage the QoS Policy Manager 40, the DPI device 50, and the Application Manager 28 functions separately and each resides on a separate component (e.g., computer). Also, each of the QoS Policy Manager 40, the DPI device 50, and the Application Manager 28 includes computer hardware and software platforms which must be scaled with growth, each with separate reliability and redundancy factors. All of which further complicate the communication network 10 and the management thereof.

Therefore, a need exists for a simplified architecture for communication systems. A need also exists for a communication system with fewer control interfaces. A further need exists for a communication system that may be implemented using components produced by more than one vendor without duplicating components (and interfaces) as in prior art communication networks. The present application provides these and other advantages as will be apparent from the following detailed description and accompanying figures.

BRIEF DESCRIPTION OF THE SEVERAL
VIEWS OF THE DRAWING(S)

DETAILED DESCRIPTION OF THE INVENTION

Figure 1:
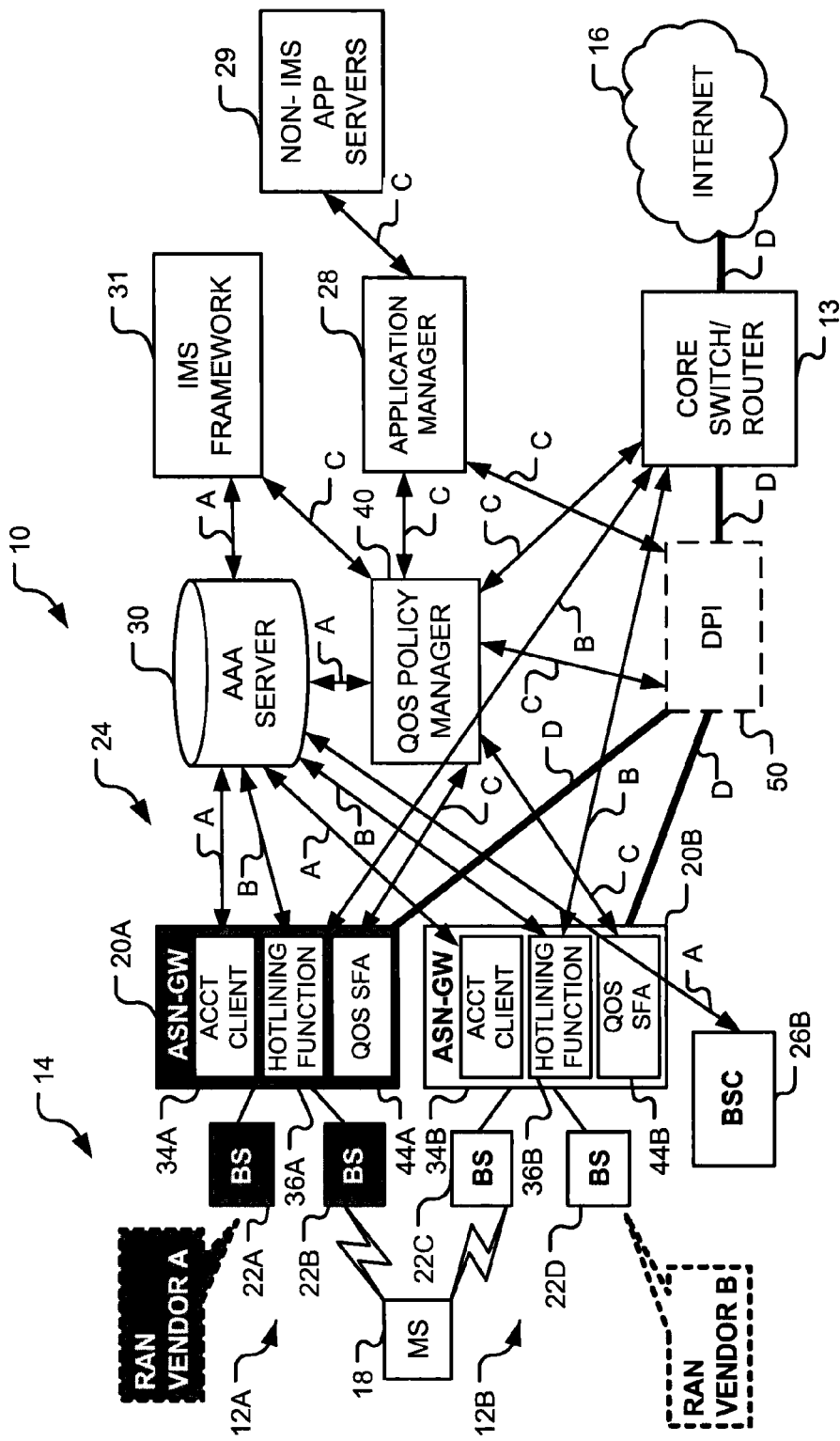
FIG. 1 is a block diagram of an exemplary prior art communication system.
Figure 2:
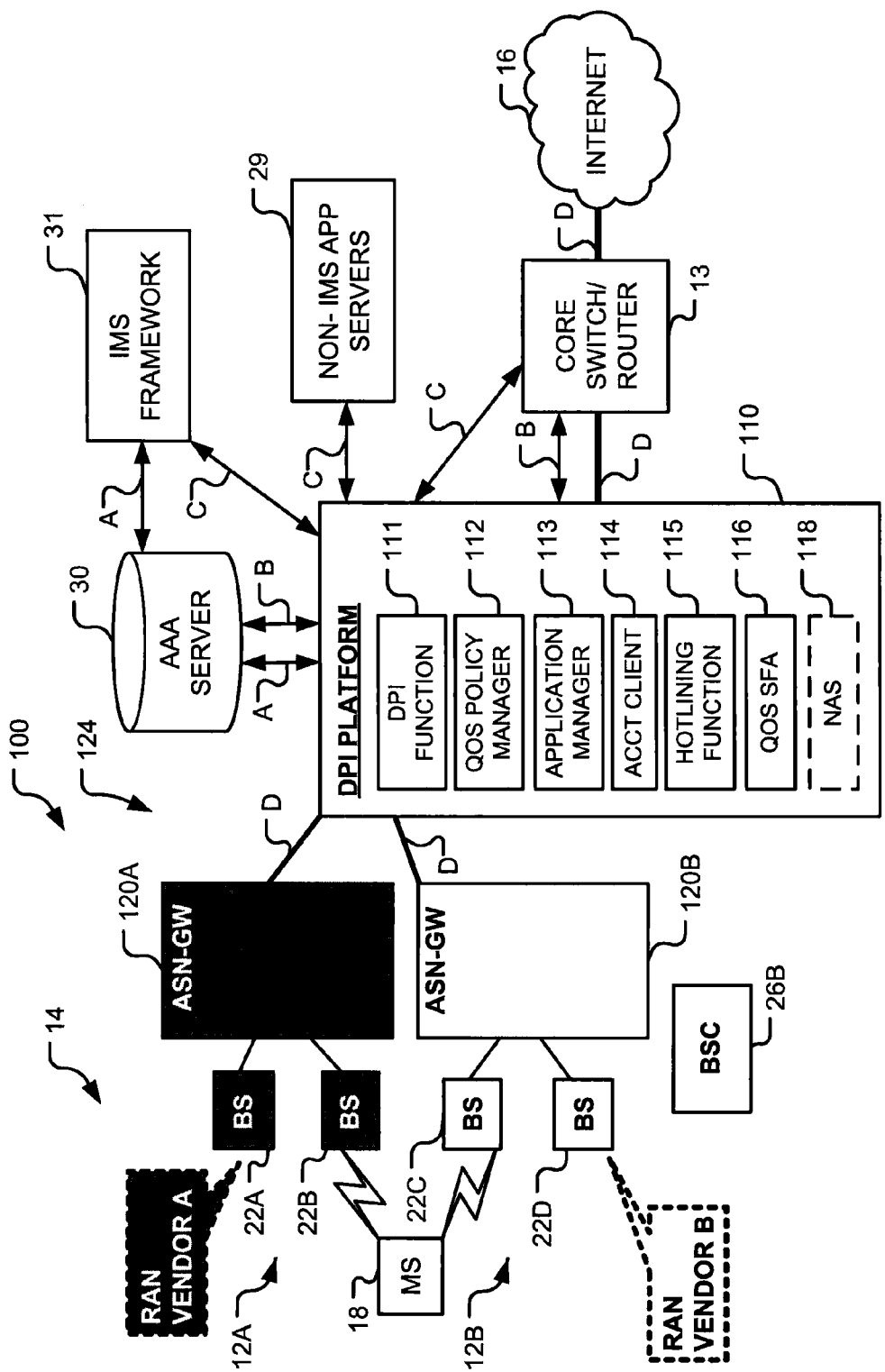
FIG. 2 is a block diagram of an exemplary embodiment communication system constructed in accordance with the present invention.

Aspects of the present invention relate to a communication system. Further aspects relate to a subscriber management system for the communication system. The architecture of the inventive communication system is based in part on pragmatic considerations related to real world network deployments and emerging technologies. The following list of abbreviations may be useful in understanding the technology discussed below:

AAA Authentication/Authorization/Accounting
ASN Access-Service-Network
ASN-GW Access-Service-Network-Gateway
BS Base-Stations
BSC Base-Station-Controller
CALEA Communications Assistance for Law Enforcement Act
DPI Deep Packet Inspection
EULA End-User-Licensing-Agreements
MS Mobile Station
HLA Hotline Application
IMS IP Multimedia Subsystem
LBS Location Based Service
MAC address Media Access Control Address
NAS Network-Access-Server
PDSN Packet-Data-Serving-Node
QoS Quality of Service
RAN Radio Access Network
SFA Service-Flow-Authorization
SFE Service Flow Enforcement
SLA Service Level-Agreement An exemplary embodiment of an inventive communication system 100 may be viewed in FIG. 2. Like components in the prior art network 10 of FIG. 1 and the inventive system 100 have been identified with like reference numerals. Like the network 10, the system 100 includes the RAN 14 coupled to a packet switched portion 124 of the system 100, which may be coupled to one or more external packet switched networks, such as the packet switched network 16. Generally speaking, the prior art subscriber management system discussed in the Background Section includes the AAA Server 30, the QoS Policy Manager 40, the DPI device 50, and the Application Manager 28, as well as components implemented on the ASN-GWs 20A and 20B (i.e., the Accounting Client 34, Hotlining function 36, and QoS SFA function 44). While present in the network 10, the core Switch/Router platform 13, IMS/Application service framework 31, and non-IMS application servers 29, are not generally considered part of the prior art subscriber management system.

The subscriber management system of the communication system 100 relocates or consolidates functionality that is distributed amongst several components in prior art systems into a single component referred to as a DPI platform 110. Specifically, referring to FIGS. 1 and 2, the DPI platform 110 incorporates the functionality of the DPI device 50, and further provides the functionality of the QoS Policy Manager 40, the Application Manager 28, the Accounting Client 34, the Hotlining function 36, and the QoS SFA function 44. Thus, the DPI platform 110 includes a DPI function 111, a QoS Policy Manager function 112, an Application Manager function 113, an Accounting Client function 114, a Hotlining function 115, and a QoS SFA function 116. Optionally, the platform 110 may include a Network-Access-Server ("NAS") 118 described below. The DPI platform 110 may also include the QoS Policy Server database (not shown) managed by the QoS Policy Manager 40 in the prior art.

In particular embodiments, this consolidation eliminates the need for two network components (e.g. computers coupled to the network), the QoS Policy Manager 40 and Application Manager 28. The consolidation also relocates the Accounting Client 34, the Hotlining function 36, and the QoS SFA function 44 from the individual ASN-GWs 20A and 20B to the DPI platform 110. Thus, the communication system 100 includes ASN-GWs 120A and 120B, which, unlike in the ASN-GWs 20A and 20B of the prior art system 10, do not include the Accounting Client 34, the Hotlining function 36, and the QoS SFA function 44.

As mentioned above, DPI is usually an essential function in any commercial communication network, such as a wireless broadband network. Because in the prior art illustrated in FIG. 1, the DPI device 50 sits "in-line" with both the bearer plane traffic and the control plane traffic, and is inspecting every packet in the network 10, the DPI device 50 is well positioned to perform virtually any type of subscriber management function. Further, because of the volume of packets inspected by the DPI device 50, it is typically subject to demanding performance requirements and typically includes high performance hardware/software components designed for more robust scaling. The DPI platform 110 is a scalable, powerful network resource that may be modified to perform the broad array of functions performed by the DPI device 50, the QoS Policy Manager 40, the Application Manager 28, the Accounting Client 34, the Hotlining function 36, and the QoS SFA function 44 in prior art systems.

The QoS Policy (including both the QoS Policy Manager function 40 and QoS SFA function 44), the Accounting Client 34, the Hotlining function 36, and the Application Manager 28 are all closely related functions that may all be implemented by inspection of control and bearer plane packets. They all interface with AAA Server 30 and the Core Switch/Router platform 13, and IMS/Application service framework 31. Thus, by centralizing these functions into the DPI platform 110, the number of interfaces and associated complexities in the system 100 is reduced.

In FIG. 2, arrows depict control plane interfaces related to these subscriber management functions. Arrows "A" show Accounting interfaces, arrows "B" show hotlining interfaces, and arrows "C" show QoS policy management interfaces. The bold black lines "D" show the data plane traffic interfaces. By comparing FIGS. 1 and 2, the reduction in the number of control plane interfaces is clear.

In the embodiment depicted in FIG. 2, two network components have been eliminated as well as a large number of network control interfaces. These reductions reduce the resources required to manage the subscriber management system. Further, relocating the Accounting Client 34, the Hotlining function 36, and the QoS SFA function 44 from the ASN-GWs 20A and 20B to the DPI platform 110 reduces the number of interfaces required by each of the ASN-GWs 120A and 120B and may permit the ASN-GWs to offer more session/bandwidth capacity for bearer plane traffic. Consolidation of the subscriber management functions and interfaces into the DPI platform 110 may make managing these functions and interfaces easier for the network operator. Further, by removing this functionality from the ASN-GWs 20A and 20B, a network operator who deploys RAN components manufactured by more than one vendor is no longer confronted with control plane subscriber management issues caused by the use of different protocols and architectures by the vendors.

The DPI platform 110, which implements the subscriber management system, sits "in-line" inspecting all control plane and bearer plane traffic. This configuration removes the need for control plane interfaces and related traffic routing on the "southbound side" of the DPI platform 110. Therefore, the DPI platform 110 imposes no consideration to traffic routing in the system 100.

As is apparent to those of ordinary skill in the art, relocating and consolidating the DPI device 50, the QoS Policy Manager 40, the Application Manager 28, the Accounting Client 34, the Hotlining function 36, and the QoS SFA function 44 may require modification of the one or more of these components and/or the methods they perform. For illustrative purposes, the following example assumes the MS 18 is communicating with the ASN-GW 20A via the BS 22B. While a single MS is depicted in FIGS. 1 and 2, those of ordinary skill in the art appreciate that plural MS may be coupled to the RAN 14 concurrently.

In prior art systems, the Accounting Client 34A in the ASN-GW 20A initiates an accounting message based on certain triggering events associated with the interface between an ASN-GW 20A and the BS 22B. The ASN-GW 20A is aware of only a limited set of triggering events related to the session between itself and the BS 22B and consequently, can generate only a limited number of accounting messages. The Accounting Client 34A subsequently sends the accounting message to the AAA server 30. The triggering events may include a communication Start Trigger and a communication Stop Trigger. When the MS 18 connects to and disconnects from the system 10, well defined protocol messages related to the initiation and termination of the session, respectively, are communicated between the BS 22B and ASN-GW 20A. These protocol messages function as triggering events (or accounting triggers) that are typically used by the Accounting Client 34A to generate start/stop type accounting messages.

In the inventive system, the DPI platform 110 may be used to detect the same well-defined protocol messages related to the initiation and termination of the session. Thus, the Accounting Client function 114 incorporated in the DPI platform 110 achieves the same functionality as the Accounting Client 34A incorporated in the ASN-GW 20A of the prior art network 10 without having any awareness of the session details between the BS 22B and the ASN-GW 120A. However, because the DPI platform 110 is inspecting all packets, it is capable of detecting more billing triggering events or accounting triggers, which its Accounting Client function 114 can use to generate accounting messages to the AAA server 30. Because the ASN-GW 20A is aware of only a limited set of triggering events related to the session between itself and the BS 22B, the prior art Accounting Client 34A incorporated into the ASN-GW 20A cannot provide accounting messages using this packet inspection technique.

In addition to detecting start/stop messages, the DPI platform 110 may be configured to measure how many and what size packets a user has sent to or received from the system 100 over a predetermined time period. Using this information, the accounting client function 114 may generate a bandwidth usage report for transmission thereby to the AAA server 30. Such reports may be generated for each subscriber or MS using the system 100. Alternatively, the DPI platform 110 may be configured to detect the type of packets (e.g., a particular type of video packets) and may inform the AAA server 30 how many minutes or bytes of each type of packets a subscriber consumed over a predetermined time period. Such information may be provided by the DPI platform 110 to the AAA server 30 for each subscriber or MS using the system 100. While a few examples have been provided, those of ordinary skill in the art appreciate that the type of statistics that may be calculated and the types of events that may be detected are virtually unlimited because the accounting client function 114 resides in the DPI platform 110. Consequently, the invention is not limited to the types of statistics and the types of events disclosed herein. Further, the AAA server 30 may be configured to generate billing information for one or more MS (or subscriber) based on any of the above pieces of information communicated to the AAA server 30.

As is appreciated by those of ordinary skill in the art, the hotlining function 115 many be implemented in many ways and the following non-limiting example is provided merely for illustrative purposes. In this example, the DPI platform 110 includes the optional NAS 118 that functions as an accounting client and brokers security authentication for the session between the MS 18 and the AAA server 30. The DPI function 111 is located between the AAA server 30 and the NAS 118. The example also assumes a Layer 2 network connection between network elements. Using this configuration, the hotlining function 115 is performed without the MS 18 and the NAS 118 being aware that it is occurring.

At Initial Network Entry (i.e., upon connection of the MS 18 to the system 100), the MS sends an Access-Request message. The message is routed by the ASN-GW 120 to the NAS 118, which forwards the message to the AAA server 30. The AAA server 30 performs authentication of the request and determines the authorization level. If the authorization of the MS 18 results in something like "new device, never before seen on the network," or "delinquent account" the user is "hotlined."

Figure 3:
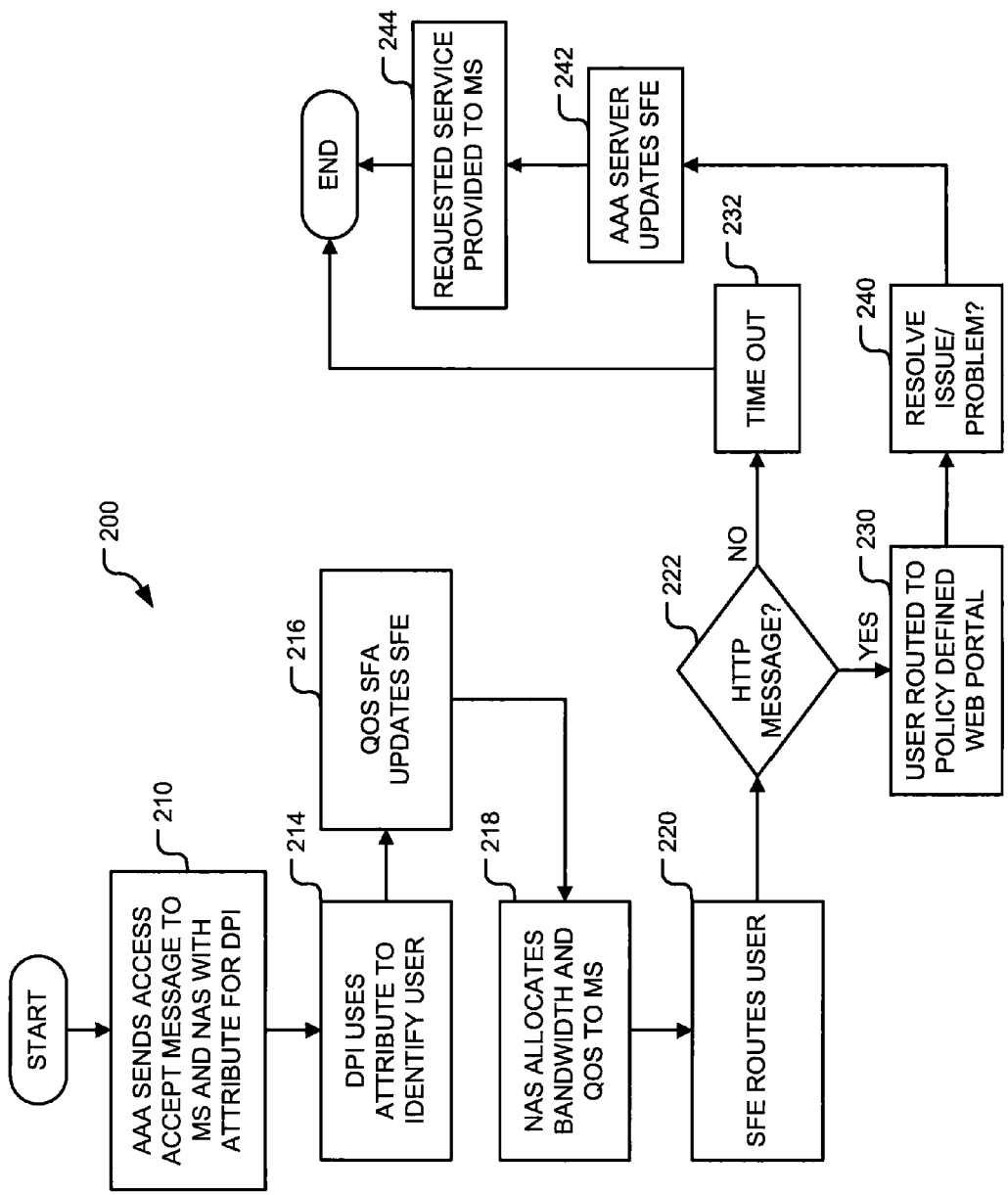
FIG. 3 is a flow diagram of an exemplary embodiment of a hotlining method implemented by the communication system of FIG. 2.

A flow diagram illustrating an exemplary hotlining process 200 described below is provided in FIG. 3. During hotlining at block 210, an Access-Accept message is triggered in the AAA server 30 and sent to the NAS 118 and the MS 18. The Access-Accept message instructs the NAS 118 to allocate an amount of bandwidth and a QoS level to the MS 18 that will provide reasonable service levels without adversely affecting paying subscribers.

In this example, an attribute that the NAS 118 does not understand is included in the Access-Accept message. This attribute is intended to be seen by the DPI function 111, which sits between the AAA server 30 and the NAS 118. At block 214, the DPI function 111 reads the attribute from the Access-Accept message and uses that attribute to identify the MS 18. The DPI function 111 is configured to use this attribute to extract the MAC address (e.g., username field). Then, the DPI platform 110 may perform a look up in its QoS Policy Server database (not shown) to determine what this code means as far as permissible IP destinations (e.g., a policy-defined portal web page). Then, at block 216, the QoS SFA function 116 sends a message to the Core Switch/Router platform 13 for Service Flow Enforcement ("SFE").

The NAS 118 will discard the attribute in the message as superfluous and allow the MS 18 access restricted only by bandwidth, not by packet data service. At block 218, the NAS 118 allocates bandwidth and a QoS to the MS 18.

At block 220, the SFE routes the user based on whether the MS 18 has provided a Hypertext Transfer Protocol ("HTTP") request. If the MS 18 attempts to access an IP address (e.g., a website), the decision in decision block 222 is "YES," and at block 230, the SFE follows the instructions of the DPI platform 110 and redirects the HTTP request to the policy-defined portal web page. If the request is anything other than an HTTP request, at block 232, the request will time out and the process 200 will terminate. The network element (e.g., Core Switch/Router platform 13) may also inject the username (or MAC address) into the redirection URL so that the portal web page may receive a request having a format similar to the following example:

http://www.portal_site.com/
hotline.php?do=signup&macaddress=00:12:34:56:78:
9a&url=http://www.original_url.com At block 240, the portal web page allows the customer to sign up for service or address problem/issues with his/her account. Upon successful account authorization, the AAA server 30 is provisioned by the billing system to allow this user access. At block 242, the AAA server 30 sends a Change of Authorization message to the QoS SFA function 116 for SFE indicating that the username (MAC Address) is now allowed on the network. Further, the QoS SFA function 116 communicates this SFE information to the relevant network elements (e.g., the core Switch/Router platform 13) and the user's service flows are enabled. Finally, in block 244, the services requested by the MS 18 are provided by the network 10 and the process 200 terminates.

Optionally, if a radio controller (such as the BSC 26B) is configured to understand the Change of Authorization message, the message is sent to the radio controller so that the RAN 14 can be configured to match the service level purchased. Otherwise, the original service level will remain on the RAN 14 until the MS 18 times out and must re-authenticate to the system 100.

In conventional prior art communication systems, like the network 10 illustrated in FIG. 1, QoS flow related messages are communicated between the QoS Policy Manager 40 and the QoS SFA function 44A which resides in the ASN-GW 20A. In the communication system 100, the functionality of the QoS Policy Manager 40 and the QoS SFA function 44 may be merged together. In other words, the lines separating the roles of these components may blur. This aspect of the communication system 100 simplifies the overall implementation of QoS Policy Management because implementing QoS SFA function 116 in the centralized DPI platform 110 essentially enables the DPI platform to perform the role of QoS Policy Manager 40 as well.

The QoS SFA function 116 incorporated into the DPI platform 110 is configured to download a user's QoS profile from the AAA server 30 at subscriber network entry phase (i.e., upon connection of the MS 18 to the system 100.) During the network entry phase, the MS 18 initiates a session with the packet switched portion 124 of the system 100. The AAA server 30 may include a separate user profile associated with each of a plurality of MS authorized to use the system 100. Then, the QoS SFA function 116 uses the user's QoS profile to evaluate any service request made by the user (which the QoS SFA function can detect using the DPI function 111). The QoS SFA function 116 of the DPI platform 110 may optionally enforce QoS locally on the service flows because the DPI platform is inspecting each packet/flow. Managing QoS using this service flow local to the DPI platform 110 may be the most efficient location in the system 100 to enforce the QoS policy.

In particular embodiments, the DPI platform 110 may be configured to implement the SFA and/or SFE by selectively allowing or disallowing service flows between the mobile stations and other components of the system 100 (e.g., the non-IMS application servers 29). For example, the AAA server 30 and/or the QoS SFA function 116 may inform the Application Manager function 113 of information related to SFA and/or SFE allowing the Application Manager function 113 to authorize one or more service flows and apply the appropriate QoS to the one or more service flows associated with a service request. Further, the Application Manager function 113 may determine the appropriate QoS to apply to other service flows associated with other mobile stations based on a particular service request received from a particular mobile station. For example, if the user of the particular mobile station has purchased a premium service, the Application Manager function 113 may reduce the QoS of other users to improve the QoS provided to the particular mobile station.

The inventive system 100 is flexible and may operate at either Layer 2 or Layer 3. However, the choice is implementation specific and may depend on the actual network topologies and design choices. DPI platforms by definition peer into all protocol layers of every packet. By way of non-limiting example, the connection between the ASN-GW 120A and Core Switch/Router platform 13 may be a switched Layer 2 Ethernet, a routed IP connection, and the like. If either a switched Layer 2 Ethernet or a routed IP connection are used, all traffic will flow through the DPI platform 110 which may inspect past both levels of protocol headers. In some cases, these connections could be tunneled, in which case the DPI platform 110 would have to be aware of the tunneling protocol. Tunneling is simply the encapsulation of a higher-level protocol into the data payload portion of a lower level. Most tunneling methods are well-defined industry protocols. The DPI platform 110 may be configured to decode the tunneling protocols using simple programmable rules well known in the art.

The inventive subscriber management system may be incorporated into an existing network or a new network. As discussed above, the subscriber management system may expand and/or improve subscriber management capabilities.

Typically, all network operators have End-User-Licensing-Agreements ("EULA") that they ask their subscribers to comply with for commercial service. These agreements tend to encompass both legal issues as well as Service Level-Agreement ("SLA") aspects pertaining to the service level that the subscriber has purchased. These policies establish basic tenants of service for both the customer and the network provider. In many cases, it is very difficult for network providers to enforce these policies. As DPI and various security detection technologies have advanced, network operators have increasing visibility and capability in these areas, however most typical architectures are limited to either allowing or blocking, or shaping a users service. In other words, these policies tend to be reactive in nature. With a system architecture that integrates many different aspects of subscriber management into the DPI platform 110, the network provider may create new approaches to managing subscriber traffic abuses, or other issues. For example, if a user is violating a term of his/her SLA (e.g., operating an unauthorized web server from their home, creating very large uplink traffic load on the network), the subscriber management system, which is monitoring usage, would determine if/when the user has reached a level that impacts other customers (e.g., customers who have paid for better service) and direct that user (using hotlining) to a web page that may offer to sell the user better service (e.g., a higher grade SLA).

Network operators are subject to increasing legal and regulatory requirements, such as CALEA. The subscriber management system may be incorporated into simple, efficient, and/or cost effective CALEA compliant communications systems.

Prior art technologies and policies tend to focus on packet data and transport level aspects of network traffic. As the Internet usage model is ever-expanding there is increasing need for network operators to become aware of application layer aspects of network traffic. For example, as multi-media, video, TV, etc become prevalent, incorporating application aware rules into EULA's and SLA's may become critical for service operators to maintain healthy networks. The subscriber management system disclosed herein allows for the novel creation, management, and enforcement of application aware policies. Hotlining and accounting are two aspects of prior art systems that can be enhanced significantly by application aware policies and which may create increase revenue for network operators.

New Internet services are emerging constantly. One example includes Location Based Service ("LBS") in which network knowledge of a user's location is used to enhance their service. LBS can be implemented in many different ways using the inventive system, including inspecting various aspects of packet headers and data content and using pre-defined rule sets to determine the user's location.

Further, the system 100 may be readily scalable. The functionality of the system 100 uses existing DPI technologies and may be extended through simple rules and web interfaces to address virtually any type of dynamic subscriber management requirements, including applications level policies, while maximizing overall efficiencies of the Core Switch/Router platform 13. These strategies may be implemented at either Layer 2 or Layer 3, with various tradeoffs. This strategy may result in lower cost deployments both in term of, increased performance, and enhanced flexibility for an operator to manage network architecture evolution requirements.

Figure 4:
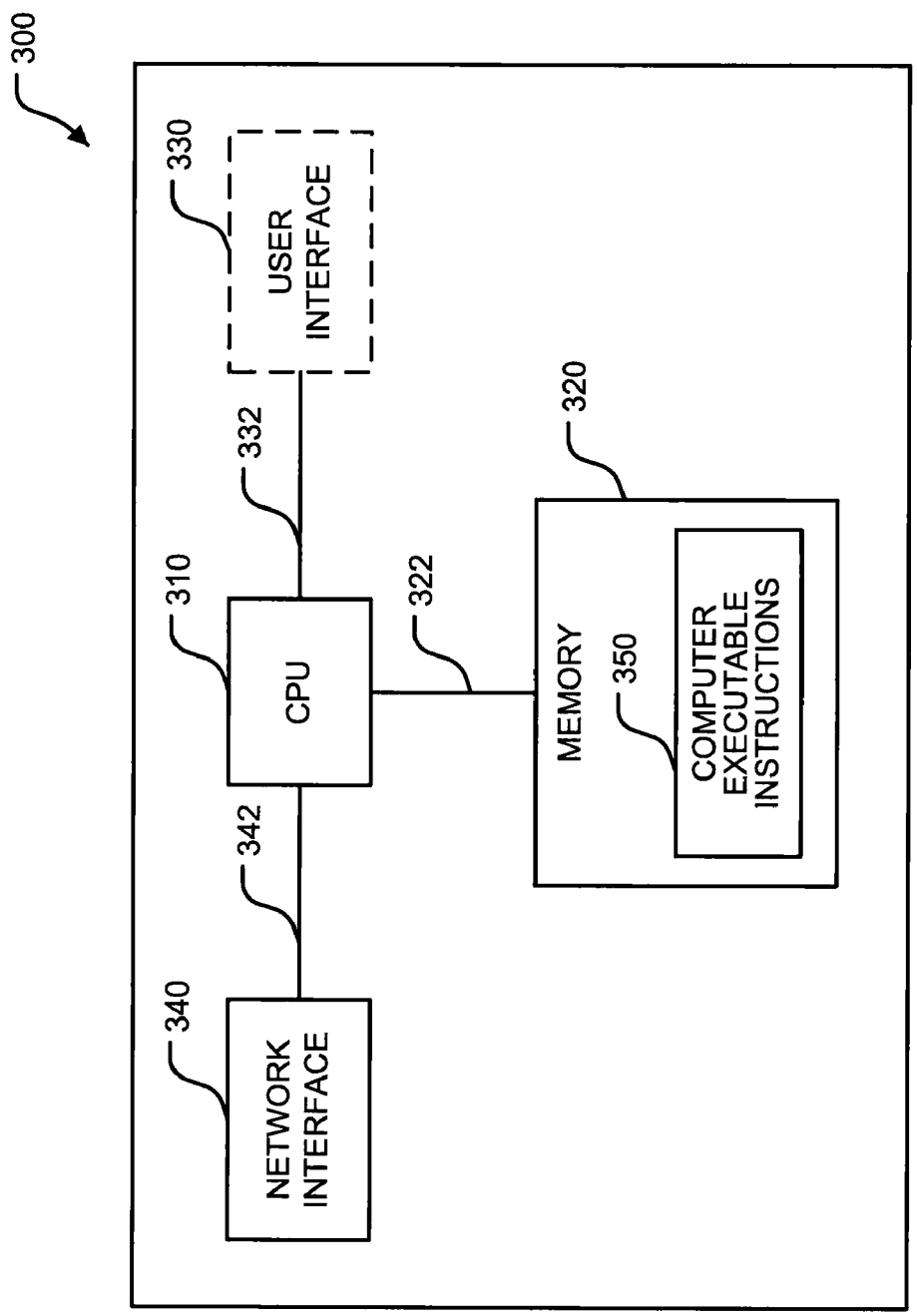
FIG. 4 is a block diagram of a computing device configured to implement a DPI platform of the communication system of FIG. 2.

FIG. 4 is a block diagram of an exemplary computing device 300 configured to implement the DPI platform 110 (see FIG. 2). As is apparent to those of ordinary skill, the functionality of the DPI platform 110 may be implemented using a single computing device 300 or distributed across several computing devices having substantially the same functionality as the computing device 300. In particular embodiments, the DPI function 111, the QoS Policy Manager function 112, the Application Manager function 113, the Accounting Client function 114, the Hotlining function 115, the QoS SFA function 116, and the optional NAS 118 are each implemented on separate computing devices having substantially the same functionality as the computing device 300.

The computing device 300 may include a programmable central processing unit (CPU) 160 which may be implemented by any known technology, such as a microprocessor, microcontroller, application-specific integrated circuit (ASIC), digital signal processor (DSP), or the like. The CPU 310 may be integrated into an electrical circuit, such as a conventional circuit board, that supplies power to the CPU 310. The CPU 310 may include internal memory or memory 320 may be coupled thereto. The memory 320 is a computer readable medium that includes instructions or computer executable components that are executed by the CPU 310. The memory 320 may be coupled to the CPU 310 by an internal bus 322.

The memory 320 may comprise random access memory (RAM) and read-only memory (ROM). The memory 320 contains instructions and data that control the operation of the CPU 310. The memory 320 may also include a basic input/output system (BIOS), which contains the basic routines that help transfer information between elements within the computing device 300. The present invention is not limited by the specific hardware component(s) used to implement the CPU 310 or memory 320 components of the computing device 300.

Optionally, the memory 320 may include internal and/or external memory devices such as hard disk drives, floppy disk drives, and optical storage devices (e.g., CD-ROM, R/W CD-ROM, DVD, and the like). The computing device 300 may also include one or more I/O interfaces (not shown) such as a serial interface (e.g., RS-232, RS-432, and the like), an IEEE-488 interface, a universal serial bus (USB) interface, a parallel interface, and the like, for the communication with removable memory devices such as flash memory drives, external floppy disk drives, and the like.

The computing device 300 may also include an optional user interface 330 having a computing display, such as a standard computer monitor, LCD, or other visual display. In some embodiments, a display driver may provide an interface between the CPU 310 and the user interface 330. The user interface 330 may include an input device, such as a standard keyboard, mouse, track ball, buttons, touch sensitive screen, wireless user input device, and the like. The user interface 330 may be coupled to the CPU 310 by an internal bus 332.

The computing device 300 also includes a network interface 340 configured to couple the computing device 300 to the network 100 (see FIG. 2). The network interface 340 may be coupled to the CPU 310 by an internal bus 342. The network interface 340 is configured to communicate (directly or via one or more intermediate interfaces) with the other components of the network 100 implemented using separate computing devices (e.g., the AAA server 30, the ASN-GW 120A, the ASN-GW 120B, the core Switch/Router platform 13, the IMS/Application service framework 31, the non-IMS application servers 29, and the like).

The various components of the computing device 300 may be coupled together by the internal buses 322, 332, and 342. Each of the internal buses 322, 332, and 342 may be constructed using a data bus, control bus, power bus, I/O bus, and the like.

In various embodiments, computer executable instructions 350 implementing the DPI platform 110 reside in the memory 320 as illustrated in FIG. 4. The computer executable instructions 350 may include instructions implementing the DPI function 111, the QoS Policy Manager function 112, the Application Manager function 113, the Accounting Client function 114, the Hotlining function 115, the QoS SFA function 116, and/or the optional NAS 118. In alternate embodiments, the instructions implementing the DPI function 111, the QoS Policy Manager function 112, the Application Manager function 113, the Accounting Client function 114, the Hotlining function 115, the QoS SFA function 116, and/or the optional NAS 118 may reside in a memory of one more computing devices having substantially the same functionality as the computing device 300.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A communication system comprising:
a packet switched network comprising an accounting server, and a deep packet inspection ("DPI") platform, the packet switched network being configured to provide an accounting interface between the accounting server and the DPI platform; and
a radio access network coupled to the packet switched network by a gateway node, the radio access network being configured to provide wireless access to the packet switched network to a plurality of mobile stations, the packet switched network comprising a first data interface between the gateway node and the DPI platform,
the DPI platform comprising a DPI function configured to examine data packets received from the gateway node over the first data interface and to detect accounting triggers in the data packets examined, the DPI platform further comprising an accounting client function configured to transmit accounting messages based on the accounting triggers detected to the accounting server over the accounting interface, the accounting server being configured to receive the accounting messages transmitted over the accounting interface and generate billing information based on the accounting messages received.

2. The system of claim 1, wherein the gateway node does not have any control interfaces with the accounting server.

3. The system of claim 2, wherein the bandwidth usage report is generated for each of the plurality of mobile stations based on how many data packets where transmitted over the first data interface between the gateway node and the DPI platform by the mobile station.

4. The system of claim 1, wherein the accounting client function is further configured to generate a bandwidth usage report and transmit the bandwidth usage report to the accounting server.

5. The system of claim 1, wherein each of the data packets transmitted over the first data interface has a type, and the accounting client function is further configured for each of the plurality of mobile stations, to determine a quantity of each type of packet transmitted over the first data interface over a predetermined time period and to inform the accounting server over the accounting interface of the quantity of each type of packet determined.

6. The system of claim 5, wherein the accounting server is further configured to generate billing information for each of the plurality of mobile stations based on the quantity of each type of packet transmitted over the first data interface over the predetermined time period.

7. The system of claim 1, wherein a duration is required to transmit each of the data packets over the first data interface, each of the data packets has a type, and the accounting client function is further configured for each of the plurality of mobile stations, to determine a total duration required to transmit the packets of each type over the first data interface over a predetermined time period and to inform the accounting server over the accounting interface of the total duration required to transmit the packets of each type.

8. The system of claim 7, wherein the accounting server is further configured to generate billing information for each of the plurality of mobile stations based on the total duration required to transmit the packets of each type over the first data interface.

9. The system of claim 1, wherein the packet switched network further comprises a core router configured to route data packets on the packet switched network, and a second data interface between the DPI platform and the core router, the DPI function being further configured to examine data packets received from the core router over the second data interface.

10. The system of claim 1, wherein the accounting triggers comprise accounting messages generated by the gateway node and transmitted thereby in data packets over the first data interface.

11. The system of claim 1, wherein the accounting server comprises a user profile associated with each of the plurality of mobile stations,
  each of the plurality of mobile stations is configured to send a service request to the DPI platform via the gateway node and the first data interface, and
  the DPI platform further comprises a Quality of Service ("QoS") Policy Manager configured to receive the user profile associated with each of the plurality of mobile stations from the accounting server and for each of the plurality of mobile stations, use the user profile associated therewith to evaluate the service request sent by the mobile station and based on the evaluation, to implement service flow authorization with respect to the service request.

12. The system of claim 1, wherein the accounting server comprises a user profile associated with each of the plurality of mobile stations,
  each of the plurality of mobile stations is configured to send a service request to the DPI platform via the gateway node and the first data interface,
  the DPI platform is configured to receive the service requests and transmit them to the accounting server over the accounting interface,
  the accounting server is configured to analyze the service requests, and based on the analysis, identify particular ones of the plurality of mobile stations for hotlining, and
  the DPI platform further comprises a hotlining function configured to hotline the particular ones of the plurality of mobile stations identified to a predetermined destination address.

13. The system of claim 1, wherein the communication system is coupled to an external packet switched network by a second data interface coupled between the external packet switched network and the DPI platform, and
  the DPI function is configured to examine data packets transmitted over the second data interface.

14. The system of claim 1, wherein the packet switched network further comprises a plurality of application servers and the DPI platform further comprises an Application Manager configured to manage communications between the plurality of mobile stations and the plurality of application servers.

15. The system of claim 1, wherein the accounting server comprises a user profile associated with each of the plurality of mobile stations,
  each of the plurality of mobile stations is configured to send a service request to the DPI platform via the gateway node and the first data interface,
  the packet switched network further comprises a plurality of application servers,
  the DPI platform further comprises an Application Manager configured to manage communications between the plurality of mobile stations and the plurality of application servers, and
  the DPI platform further comprises a Quality of Service ("QoS") Policy Manager configured to receive the user profile associated with each of the plurality of mobile stations from the accounting server and for each of the plurality of mobile stations, use the user profile associated therewith to evaluate the service request sent by the mobile station and based on the evaluation, and to inform the Application Manager of a level of service to implement with respect to communications related to each of the service requests, the Application Manager being configured to implement the level of service with respect to communications related to each of the service requests.

16. A communication system for use with a mobile station comprising:
  a radio access network comprising a gateway node configured to couple the radio access network to a packet switched network, the radio access network being wirelessly coupled to the mobile station, the gateway node of the radio access network being configured to receive an access request message from the mobile station; and
  the packet switched network comprising an accounting server, a deep packet inspection ("DPI") platform, and a core router, the packet switched network comprising a first data interface between the gateway node of the radio access network and the DPI platform, the gateway node being configured to transmit the access request message to the DPI platform over the first data interface,
  the DPI platform comprising a DPI function configured to examine data packets received from the gateway node over the first data interface, and a Network-Access-Server ("NAS") configured to receive the access request message and transmit the access request message to the accounting server, the accounting server being configured to receive the request and in response to receiving the request, determine whether to hotline the mobile station,
  when the determination is made to hotline the mobile station, the accounting server being configured to transmit an accept message to the NAS, the accept message including an attribute ignored by the NAS, the NAS being configured to allow the mobile station to use of the packet switched network, the DPI function being configured to use the attribute ignored by the NAS to determine permissible network destinations for the mobile station and to inform the core router of the permissible network destinations, and the core router being configured to implement Service Flow Enforcement ("SFE") by routing the mobile station to only the permissible network destinations.

17. The system of claim 16, wherein the gateway node does not have any control interfaces with the accounting server.

18. The system of claim 16, wherein the gateway node does not have any control interfaces with the core router.

19. The system of claim 16, wherein the DPI platform includes a Service-Flow-Authorization ("SFA") function configured to inform the core router of the permissible network destinations for implementing SFE.

20. The system of claim 16 for use with a mobile station configured to request access to an internet address using Hypertext Transfer Protocol ("HTTP"), wherein when the determination is made to hotline the mobile station, and the mobile station requests access to an internet address using HTTP, the permissible network destinations include a policy-defined portal web page.

21. The system of claim 20 for use with a mobile station further configured to successfully complete an account authorization using the policy-defined portal web page, wherein following successful completion of the account authorization by the mobile station, the accounting server is configured to inform the DPI platform that the mobile station is authorized to use the packet switched network, and the DPI is further configured to inform the core router that the mobile station is authorized to use the packet switched network.

22. The system of claim 16 for use with a mobile station configured to request access to an internet address using a protocol other than Hypertext Transfer Protocol ("HTTP"), wherein the accounting server determines whether to hotline the mobile station based on whether the mobile station is authorized to use the packet switched network, and
when the mobile station is not authorized to use the packet switched network, and the mobile station requests access using the protocol other than HTTP, the core router is configured to allow the request to time out.

23. A communication system for use with a mobile station comprising:
a radio access network comprising a gateway node, the radio access network being configured to communicate wirelessly with the mobile station,
a packet switched network comprising a deep packet inspection ("DPI") platform, a first data interface between the gateway node of the radio access network and the DPI platform, and an accounting server comprising a user profile associated with the mobile station, the DPI platform comprising a DPI function configured to examine data packets received from the gateway node over the first data interface to identify a service request transmitted by the mobile station via the gateway node, and a Quality of Service ("QoS") Policy Manager configured to receive the user profile associated with the mobile station from the accounting server and use the user profile to evaluate the service request and based on the evaluation, to implement service flow authorization with respect to the service request.

24. The system of claim 23, wherein the QoS Policy Manager is configured to implement service flow authorization locally on the DPI platform.

25. The system of claim 23, wherein the QoS Policy Manager is configured to receive the user profile associated with the mobile station from the accounting server by downloading the user profile from the accounting server when the mobile station initiates a session with the packet switched network.

26. The system of claim 23, wherein the gateway node does not have any control interfaces with the accounting server.

27. The system of claim 23, wherein the QoS Policy Manager is further configured to based on the evaluation of the user profile, determine a level of service to implement with respect to the service request.

28. The system of claim 27, wherein the QoS Policy Manager is configured to implement the level of service with respect to the service request.

29. The system of claim 28, wherein the QoS Policy Manager is configured to implement the level of service with respect to the service request locally on the DPI platform.

30. The system of claim 23, wherein the packet switched network further comprises a plurality of application servers and the DPI platform further comprises an Application Manager configured to implement service flow authorization with respect to the service request by managing communications between the mobile station and the plurality of application servers.

31. The system of claim 23, wherein the QoS Policy Manager is further configured to based on the evaluation of the user profile, determine a level of service to implement with respect to the service request,
the packet switched network further comprises a plurality of application servers, and
the DPI platform further comprises an Application Manager configured to implement the level of service determined with respect to the service request by managing communications between the mobile station and the plurality of application servers.

32. The system of claim 31 for use with a plurality of different mobile stations coupled to the radio access network and communicating with the packet switched network via the gateway node and the first data interface, wherein the DPI platform further comprises an Application Manager configured to implement the level of service determined with respect to the service request by managing communications between the plurality of different mobile stations and the plurality of application servers.

* * * * *